J. F. TAYLOR.
Rice Cleaner.
No. 17,646.  Patented June 23, 1857.
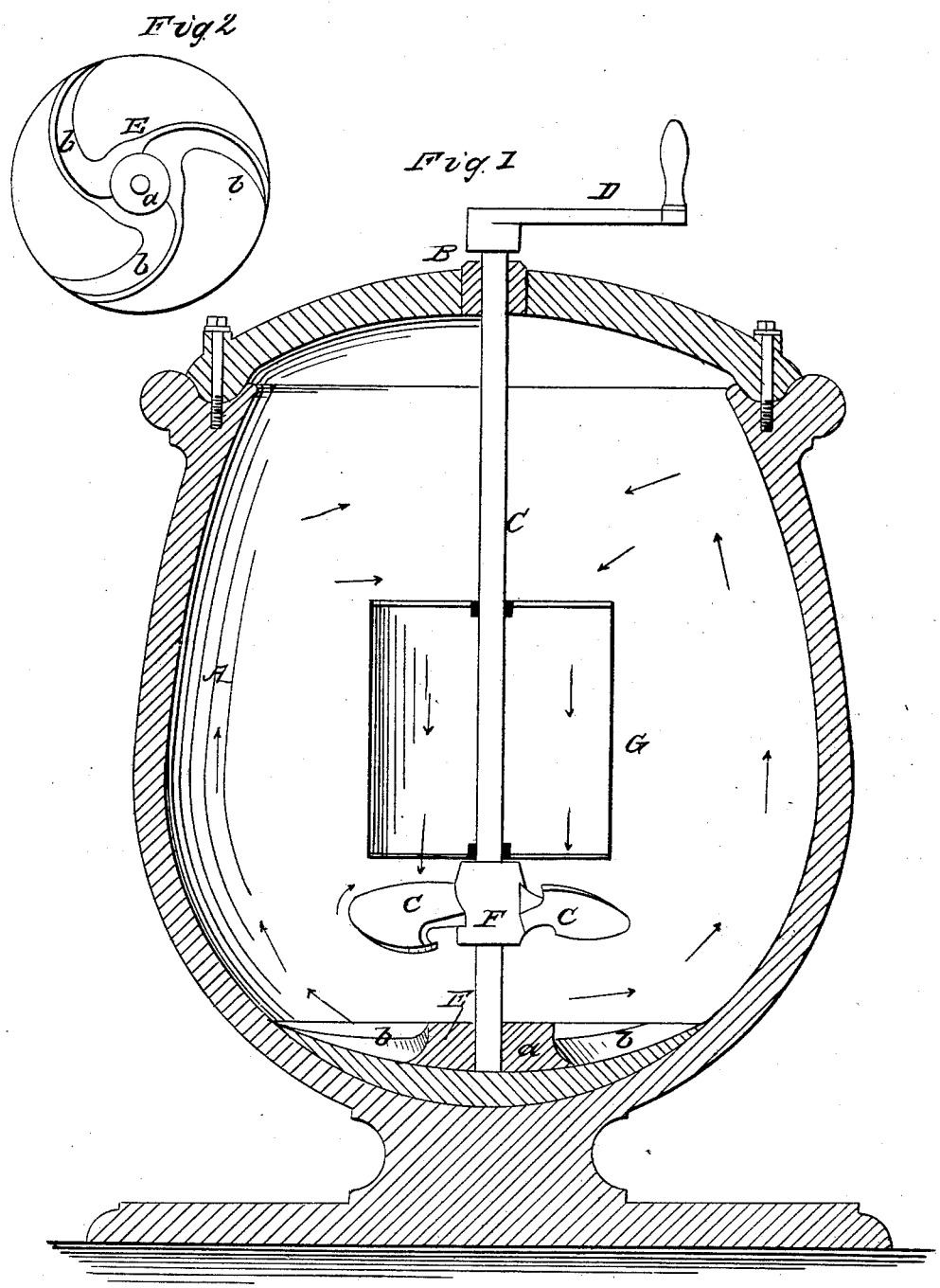

UNITED STATES PATENT OFFICE.

JOHN F. TAYLOR, OF CHARLESTON, SOUTH CAROLINA.

MACHINE FOR CLEANING RICE.

Specification of Letters Patent No. 17,646, dated June 23, 1857.

*To all whom it may concern:*

Be it known that I, JOHN F. TAYLOR, of Charleston, in the district of Charleston and State of South Carolina, have invented a new and Improved Machine for Cleaning Rice; and I do hereby declare that the following is a full, clear, and exact description of the same, reference being had to the annexed drawings, making a part of this specification, in which—

Figure 1 is a vertical central section of my improvement, and Fig. 2 a detached plan view of the plate on which the spiral ledges or projections are formed.

The object of this invention is to rub or take off in an expeditious and perfect manner the flour which encompasses the kernels or grains of rice and which lies beneath the integuments or hulls. Rice has hitherto been cleaned; that is, deprived of this flour by means of pestles or mortars, so operated as to move the body of rice in the vessel in which the pestle falls, and thereby produce sufficient attrition between the kernels or grains to rub off the exterior coating of flour, the rice having been previously hulled by being passed through stones. This cleaning of the rice by means of pestles or mortars, and known as rice pounding, is a slow operation, and the kernels or grains are liable to be broken and bruised.

My invention consists in giving a necessary movement to a body or mass of rice placed within a proper shaped vessel by means of a screw, cylinder, and guiding or deflecting plate placed at the bottom of the vessel, the whole being so arranged that the kernels or grains of rice are made to rub against each other, so that they will be thoroughly deprived of the flour by the attrition produced thereby and the grain prevented from being bruised and broken.

To enable those skilled in the art to fully understand and construct my invention, I will proceed to describe it.

A represents the vessel in which the rice to be cleaned is placed. The lower part of this vessel, internally, is of spherical form, and the sides incline slightly inward, as plainly shown in the drawing. The internal form of the vessel as a whole may be described as being similar to that of an egg, a certain portion of the point being removed. The upper end of the vessel A is provided with a cross bar B and a vertical shaft C is fitted centrally within the vessel, the lower end being stopped, as shown at (*a*) and the upper part passing through the bar B. The upper end of the shaft C has a crank D placed on it.

To the bottom of the vessel A a circular concave or dish-shaped plate E is fitted, and this plate has spiral projections or ledges (*b*) formed on it, as shown clearly in Fig. 2. On the lower part of the shaft C a screw F, formed of the flanches (*c*) (*c*) is attached. The screw F is placed on the shaft a short distance above the plate E, and on the shaft C a hollow cylinder G is secured. This cylinder is placed just above the screw F and is attached permanently to the shaft C.

The operation is as follows: The rice having been previously hulled, in the usual or in any proper way, is placed within the vessel A and the shaft C is rotated in any proper manner. As the shaft rotates the rice below the screw is forced downward by the action of the screw and the spiral projections or ledges (*b*) deflect the rice outward, and as the action of the screw while rotating is continuous, the rice will be forced upward at the sides of the vessel and will pass down through the cylinder G and again underneath the screw, which causes the rice to move in a regular current, as indicated by the red arrows. The black arrow shows the direction of the movement of the screw F. The cylinder G gives the proper direction to the rice and prevents it from passing too quickly over the screw, and the spiral projections or ledges (*b*) give the proper direction to the lower mass or body of the rice, causing it to spread out so that it may pass upward at the sides of the vessel. The motion or movement given the rice by means of the screw in connection with the cylinder and spiral projections or ledges on the plate at the bottom of the vessel, causes sufficient attrition between the kernels or grains to cause the flour to be thoroughly removed therefrom.

I am aware that a screw has been previously used for similar or analogous purposes, but the screw alone has proved insufficient to answer the desired purpose. A sufficient movement or agitation of the kernels or grains can not be produced by it.

I do not claim separately the screw F, for that has been previously used; neither do I claim the peculiar form of the vessel A, for both have been previously used for the same or analogous purposes; but,

Having thus described my invention, what I claim as new, and desire to secure by Letters-Patent, is:

The screw F and cylinder G placed on the rotating shaft C, in combination with the spiral projections or ledges (b) formed on the plate E and placed at the bottom of the vessel A; the whole being arranged so as to operate conjointly as and for the purpose set forth.

JOHN F. TAYLOR.

Witnesses:
A. W. BLACK,
THOMAS BONNELL.